United States Patent Office 3,034,899
Patented May 15, 1962

3,034,899
STABILIZED SODIUM ACID PYROPHOSPHATE BAKING ACID AND METHOD OF MAKING THE SAME
James W. Tucker, Park Forest, Ill., assignor to Stauffer Chemical Company, New York, N.Y., a corporation of Delaware
No Drawing. Filed Mar. 8, 1960, Ser. No. 13,446
9 Claims. (Cl. 99—95)

This invention relates to stabilized sodium acid pyrophosphate and the method by which it is produced.

Sodium acid pyrophosphate baking acid ($Na_2H_2P_2O_7$) is widely used commercially in the preparation of baked goods such as doughnuts, pancakes, biscuits, cakes, etc. When added to a moist batter or dough the acid reacts with a $CO_2$ liberating compound included in the batter or dough, e.g., sodium bicarbonate, to yield the gas necessary for leavening. The rate of gas evolution is an important consideration, determining largely the density and texture qualities which will be imparted to the final baked product. This rate must be controlled within rather narrow limits for some applications, e.g., in the preparation of canned biscuits. Moreover, leavening requirements differ appreciably among the various baked goods, for each of these demands a particular speed of evolution to insure highest quality products.

The rate of $CO_2$ evolution in a baking preparation is primarily controlled by the reactivity of the acid component used. Because of this, it is very desirable that the reactivity of a baking acid be predictable and unchanging. With sodium acid pyrophosphate the speed of reaction is set at the desired level by means of special techniques of manufacture. Unfortunately, the reactivity tends to change thereafter when the acid is exposed to climatic conditions upon storage. The speed of reaction usually increases being accelerated by storage at high temperatures and/or high humidities. Instability is a disturbing problem with this compound, since otherwise it has very desirable baking characteristics.

Various methods for fixing the speed of reaction, especially for slow-reacting sodium acid pyrophosphate, are suggested in the prior art, see U.S. Patents 2,844,437 and 2,408,258. Mainly, these suggestions teach the incorporation of minute quantities of certain impurities in the orthophosphate mixture from which sodium acid pyrophosphate is subsequently produced by molecular dehydration. Today, a large percentage of the sodium acid pyrophosphate produced by industry contains the impurities taught by the prior art. Nevertheless, this method of "stabilization" does not offer an absolute panacea for the problem. So "stabilized," the acid still shows appreciable changes in reactivity during storage, especially an acid with higher reactivity. The slower acids change significantly when exposed to severe conditions of temperature and humidity or in milder conditions for prolonged periods of exposure. During the summer season in temperate climates, or in warmer climates during any season, it is common for the speed of reaction to change by 10 to 25% of the originally set value.

It has now been found that a substantial improvement in stability can be accomplished by adding a finely divided calcium salt to sodium acid pyrophosphate after its reactivity is originally set by the manufacturing process.

The required quantity of calcium salt is usually dry-mixed with the acid, being brought into intimate contact by a suitable mixing or blending apparatus.

The ability of calcium compounds to stabilize sodium acid pyrophosphate baking acid, after setting the original reactivity, was not anticipated. Apparently, when a calcium compound is mixed into sodium acid pyrophosphate the two compounds become intimately associated in some manner which precludes the deteriorating effects of storage at atmospheric conditions. Although we do not wish to be bound to any specific theory, there is some reason to believe that the calcium compound reacts with sodium acid pyrophosphate to produce a barrier or coating of some sort about the surface of the sodium acid pyrophopate particles.

The calcium compounds which have been found to be effective stabilizers all have pH values higher than the sodium acid pyrophosphate to be stabilized, which is usually about 4.1 to about 4.5. Also, calcium compounds with pH values above about 10.0 usually do not stabilize sodium acid pyrophosphate, or at best show somewhat erratic behavior as stabilizers. Where mentioned herein, the pH value is that which the compound will exhibit when tested in a 1% solution for those compounds which are soluble to at least that extent, and for less soluble compounds the pH values are those found in a 10% to a 20% slurry. Both inorganic and organic calcium salts are effective in stabilizing the reaction rates; among them, the preferred compounds are tricalcium phosphate, calcium lactate, calcium stearate, and dicalcium phospate. The quantity required to accomplish maximum stabilization varies slightly between these different compounds, but in all cases is not more than 2.0% based on the weight of the acid to be stabilized. Other calcium compounds have been found to show ability for fixing the reaction rate, although some of these are not as effective or as edible as the preferred compounds. Among the more important compounds of this group are calcium sulfate, calcium sodium pyrophosphate, calcium tripolyphosphate, and calcium gluconate.

Improvement of stability depends upon both the initial stability of the acid and the activity of the particular salt used. More stable acids generally require a much smaller quantity of salt to achieve maximum possible improvement. The preferred quantity of additive, and that which imparts maximum stability in most cases, is between about 0.5% to about 1.0%, based on the original weight of the acid. At the maximum possible stability within the preferred range of additives, soduim acid pyrophosphate will not change in reactivity under normal storage conditions by more than about 5% of the originally set reaction rate, but the change is usually found to be not more than 1% or 2% except where severe exposure conditions are encountered.

I have also found that the present invention offers better stability if the mixing of the solids is accomplished in the presence of an atmosphere containing a significant amount of water vapor, e.g., at least about 0.5% water by weight of the atmosphere. In the alternative, dry-mixed solids may be subsequently exposed to a suitable steam or moisture treatment to effect maximum stabilization. Where the solids contain sufficient moisture before mixing it will not usually be necessary to subject the mixture to additional moisture treatment.

The partial ester compositions of the invention have substantial alpha crystal stability. The presence of substantial amounts of unsaturated fatty acid esters reduces such alpha crystal stability. The fatty acid moieties comprising the present partial ester compositions generally are composed of less than 5 mole percent of unsaturated fatty acid moieties, and preferably are substantially completely saturated. The present partial ester compositions thus have low iodine values. Similarly, alpha crystal stability is reduced if the fatty acid moieties of the glycerol partial ester and the fatty acid moieties of the 1,2-propanediol partial ester are substantially different. The partial ester compositions of the invention desirably have at least 75, and preferably 90, mole percent of the same fatty acid moieties on each of the partial esters of the present compositions as described above.

To further illustrate the specificity of the components comprising the present partial ester compositions, substitution of closely related ethylene glycol, 1,3-propanediol or 2,3-butanediol for the 1,2-propanediol in preparing the fatty acid partial ester of 1,2-propanediol component of the invention, results in a product having a substantially more rapid alpha to beta crystal shift than the present partial ester compositions.

Aqueous dispersions of the present partial ester compositions have even further extended alpha crystal stability. Generally such aqueous dispersions are prepared to contain about 30% to 70%, and preferably about 45% to 60%, by weight of water based on the dispersion to form dispersions having a paste-like consistency, although the amount of water used can be widely varied. Such aqueous dispersions can be prepared by dispersing in water the present partial ester compositions in powder form, or by dispersing a molten mixture of the present partial ester compositions directly in water. By the latter method, the water is desirably first warmed to a temperature of from about 30° C. up to the melting point of the partial ester composition. The resulting aqueous dispersion can then be allowed to cool with agitation to ambient storage or shipping temperatures, "Votating" such as described in United States Patents 2,063,065 and 2,063,066 being a particularly useful cooling and agitating method.

Sorbic acid is preferably added as a mold inhibitor to aqueous dispersions of the present conjoined crystals. We have found that sorbic acid not only functions as a mold inhibitor but also serves to impart improved properties to the compositions of the invention not imparted by other common mold inhibitors such as sodium propionate. For example, foam-type cakes such as sponge cakes have improved volume and grain when baked with the present conjoined crystal compositions of the invention containing sorbic acid. Sorbic acid is particularly useful when cationic matter such as residual catalyst materials are present in the present partial ester compositions. In addition to sorbic acid and sodium propionate, other well-known mold inhibitors can be utilized in the partial ester compositions of the invention including propionic acid, lactic acid, benzoic acid, butyric acid, and sodium, potassium or calcium seals thereof, as well as sodium diacetate and others.

The fatty acid partial esters of glycerol and 1,2-propanediol can be prepared separately and then admixed to prepare the present mixtures of the invention. Likewise, such mixtures can be prepared by interesterifying a triglyceride having suitable fatty acid moieties, or free fatty acids, with glycerol and 1,2-propanediol and thereafter separating out a suitable partial ester composition.

The monoglyceride portion of the present partial ester compositions can be prepared by reacting a suitable triglyceride such as tristearin, or a suitable fatty acid such as stearic acid, or a fatty acid ester of a lower monohydric alcohol such as methyl stearate, with glycerine in the presence of an alcoholysis catalyst, and thereafter separating a purified and concentrated monoglyceride portion by thin film, high vacuum distillation, or by any other suitable separating techniques. The preparation of high purity monoglycerides by thin film, high vacuum distillation is described in United States Patents 2,634,234, 2,634,278 and 2,634,279. By substituting 1,2-propanediol for the glycerol in the reaction with the fatty acid, the monoesters of 1,2-propanediol used in the invention can be similarly prepared, camphorsulfonic acids being particularly effective catalysts. The partial esters employed in preparing the present conjoined crystals are preferably high purity materials being at least about 90% monoester such as are prepared by thin film high vacuum distillation, mixtures of mono- and diesters showing a relatively more rapid alpha to beta crystal shift.

In accordance with usual practice, we prefer to utilize antioxidants or stabilizers in our conjoined crystal compositions, including such antioxidants as 2,6-ditertiary-butyl-4-methylphenol, butylated hydroxyanisole and mixtures thereof, tocopherol, and other well-known antioxidants for fat or oleaginous materials. Mixtures of glycine and phosphoric acid, such as are described in United States Patent 2,701,769, are particularly effective.

The present partial ester compositions have considerable utility in the baking art as the monoglycerides therein retain a desired alpha polymorphic crystalline form for substantial periods. Bread prepared with the present partial ester compositions has extended shelf-life. Likewise, cakes have improved texture, volume and grain when prepared with the partial esters of the invention. In addition, the partial ester of 1,2-propanediol is a good emulsifier and supplements the monoglyceride portion of the present conjoined crystals. The partial ester compositions of the invention while being useful emulsifiers are also fully edible and wholesome and contribute nutritionally to foods to which they are added.

The invention is further illustrated by the following examples of preferred embodiments thereof.

EXAMPLE 1

One thousand one hundred and sixty grams of fully hydrogenated lard flakes, 244 grams of glycerol and 304 grams of 1,2-propanediol and 1.7 grams of strontium hydroxide were reacted for two hours at 250° C. The reaction product was distilled in a molecular centrifugal still. The excess propylene glycol and glycerol were removed by stripping and a mixed 1,2-propanediol monoester-glycerol monoester was distilled between 90° and 130° C. and at a pressure of $20\mu$. The distillate, amounting to 35% of the reaction product, had a composition of 0.43 mole of glycerol monoester and 0.57 mole of 1,2-propanediol monoester. Three hundred and twelve grams of this distillate and .02% glycine in a 4% glycerol solution and .02% phosphoric acid in a 33% glycerol solution were heated to 85° C. and spray chilled through a spray head of the type used to spray paint (De Vilbiss spray gun) into an open-head container at room temperature to produce a finely powdered, free-flowing product having a mesh size smaller than 100 mesh. Only 4% of the glycerol monoester in the finely powdered product was in the beta crystal form with the remainder in the alpha crystal form as determined by infrared analysis. The finely powdered product was readily dispersible in room temperature water.

EXAMPLE 2

Methyl stearate was prepared and fractionally distilled to obtain pure methyl stearate. A purified glycerol monostearate was prepared in the following manner: 575 grams of methyl stearate, 236 grams of C.P. glycerol, and 0.8 gram strontium hydroxide were heated at 250° C. for 4 hours under nitrogen. Excess glycerol was removed and the reaction product distilled in a molecular centrifugal still at a temperature of 130–140° C. at $10\mu$ pressure. The distilled product analyzed 88% 1-monoglyceride phosphate. The following data show the results of these tests:

| Calcium Stearate Added to the Acid, Percent | Initial 2 Min. Reaction Rate, cc. | 2 Min. Rate After Exposure for 5 Hrs. at 140° F. and 75% Relative Humidity, cc. |
| --- | --- | --- |
| Control—no additive | 46 | 67 |
| 0.10 | 44 | 62 |
| 0.25 | 44 | 52 |
| 0.50 | 43 | 50 |
| 0.75 | 44 | 46 |
| 1.0 | 43 | 44 |

The testing procedure outlined previously was applied to a series of tests using dicalcium phosphate dihydrate as the stabilizer salt with one lot of fairly unstable sodium acid pyrophosphate. The following results were obtained:

| Dicalcium Phosphate Added to the Acid, Percent | Initial 2 Min. Reaction Rate, cc. | 2 Min. Rate After Exposure for 5 Hrs. at 140° F. and 75% Relative Humidity, cc. |
| --- | --- | --- |
| Control—no additive | 46 | 60 |
| 0.25 | 47 | 56 |
| 0.50 | 46 | 51 |
| 0.75 | 45 | 46 |
| 1.0 | 46 | 44 |

Other calcium-containing compounds tested also showed some stabilizing activity, but usually the maximum obtainable stability was below that of the preferred compounds. Using the method set forth above, many palatable calcium compounds suitable as food additives were tested. A few of those which demonstrated high activity are given below:

| Acid Tested, Lot No. | Stabilizing Compound Used and Percent Added to Given Acid Lot | Initial 2 Min. Reaction Rate, cc. | 2 Min. Rate After exposure for 5 Hrs. at 140° F. and 75% Relative Humidity, cc. |
| --- | --- | --- | --- |
| 1 | Control—no additive | 45 | 60 |
| 1 | 0.25% calcium sulfate | 44 | 56 |
| 1 | 0.50% calcium sulfate | 44 | 57 |
| 1 | 0.75% calcium sulfate | 44 | 54 |
| 1 | 1.0% calcium sulfate | 47 | 48 |
| 2 | Control—no additive | 44 | 60 |
| 2 | 0.10% calcium gluconate | 46 | 62 |
| 2 | 0.25% calcium gluconate | 46 | 63 |
| 2 | 0.50% calcium gluconate | 44 | 56 |
| 2 | 0.75% calcium gluconate | 44 | 54 |
| 2 | 1.0% calcium gluconate | 45 | 50 |
| 3 | Control—no additive | 46 | 59 |
| 3 | 0.25% calcium tripolyphosphate | 46 | 57 |
| 3 | 0.75% calcium tripolyphosphate | 47 | 56 |
| 3 | 1.0% calcium tripolyphosphate | 47 | 53 |
| 3 | 1.5% calcium tripolyphosphate | 44 | 50 |
| 3 | 2.0% calcium tripolyphosphate | 44 | 49 |

The untested portion of those samples containing tricalcium phosphate tested for reactivity changes and reported herein, supra, were used as the leavening acid for baking a batch of biscuits. Because stabilized sodium acid pyrophosphate is primarily used as a leavening agent, this study was undertaken to establish whether baked products would show any adverse effect as a result of adding the various calcium salts. Although some numerically quantitative data resulted from these tests, credence must also be given to the objective visual and taste impressions. Tests of the latter nature, where reported herein, were made by observers qualified to assess the properties of baked goods.

All the biscuits, both those made with samples containing calcium salts and those containing the control samples, had a slightly open grain, light golden brown crust, and a somewhat creamy over-all color. Their pH values ranged between 7.45 and 7.56, being within the normal range of experimental accuracy for identical acid leavening agents. Volume and rise height qualities of the biscuits were determined by measuring these values with batches containing six biscuits each. The results ranged between 450 cc. and 530 cc. for the volume of each of the various batches and the total height of each batch ranged between 7.5 and 8.0 inches. Deviations in volume and rise height, however, are not unusual, being normally found between biscuits using the same leavening acid. The deviations found herein were within experimental accuracy and of a random nature, not being attributable to any differences in the leavening agent. Taste, symmetry and crumb characteristics were found to be virtually indistinguishable between the control samples and those containing calcium additives. Summarily, none of the standard bake tests used uncovered characteristics which would distinguish between goods baked with the calcium-stabilized acids and those containing no additives.

Refrigerated canned biscuits, a product of current commercial importance, must be "proofed" in the can during manufacture to give pressures within a fairly narrow range. Experiments were conducted to ascertain the proofing pressures of canned biscuit preparations containing acids with the calcium compounds suggested herein. Acid samples containing tricalcium phosphate, calcium stearate, calcium lactate, and dicalcium phosphate were prepared, together with a control sample from each acid lot. These were used as the leavening agent in canned biscuit dough which was proofed at times of 15, 30, 45, and 60 minutes. No distinguishing difference in the rate of proofing was noted between the control samples and those which contained the various calcium salts.

All of the tests reported herein employ sodium acid pyrophosphate containing the small quantities of impurities suggested in U.S. Patent 2,844,437. The starting materials for this invention include sodium acid pyrophosphate baking acid and organic and inorganic calcium salts. The acid containing any of the impurities suggested in the prior art as well as acid not containing them or used for other purposes than baking, can be stabilized by this invention. Because intimate contact between the sodium acid pyrophosphate and the added calcium salt is desired, finely divided materials are preferred, e.g., tricalcium phosphate N.F. passing 95% through a 200 mesh screen. In some cases it may be more practical to mill one or both of the dry materials before mixing them.

Many variations and modifications are within the scope and spirit of the invention herein described, and therefore no unnecessary limitations should be understood from the above specification.

I claim:

1. As a composition of matter, sodium acid pyrophosphate and a stabilizing amount of an edible calcium salt having a pH within the range of about 4.1 to about 10.0.

2. As a composition of matter, sodium acid pyrophosphate having intimately associated therewith from 0.1% to 2.0% by weight of an edible calcium salt having a pH within the range of about 4.1 to about 10.0.

3. Sodium acid pyrophosphate and a stabilizing amount of a member selected from the group consisting of tricalcium phosphate, calcium stearate, calcium lactate, dicalcium phosphate, calcium gluconate, calcium tripolyphosphate, calcium sulfate, and mixtures thereof.

4. Sodium acid pyrophosphate having intimately associated therewith from 0.1% to 2.0% by weight of a member selected from the group consisting of tricalcium phosphate, calcium stearate, calcium lactate, dicalcium phosphate, calcium gluconate, calcium tripolyphosphate, calcium sulfate, and mixtures thereof.

5. Sodium acid pyrophosphate having intimately associated therewith about 0.5% to about 1.0% by weight of tricalcium phosphate.

6. Sodium acid pyrophosphate having intimately associated therewith from about 0.5 to about 1.0% by weight of calcium stearate.

7. Sodium acid pyrophosphate having intimately associated therewith from about 0.5% to about 1.0% by weight of calcium lactate.

8. Sodium acid pyrophosphate having intimately associated therewith from about 0.5% to about 1.0% by weight of dicalcium phosphate.

9. The method for stabilizing sodium acid pyrophosphate against appreciable changes in its reaction rate characteristics which comprises intimately admixing therewith from 0.1% to 2.0% by weight of a finely divided calcium salt having a pH within the range of about 4.1 to about 10.0.

References Cited in the file of this patent
UNITED STATES PATENTS

| | | |
|---|---|---|
| 1,834,747 | Stokes et al. | Dec. 1, 1931 |
| 2,870,017 | Barch | Jan. 20, 1959 |